Figures 1, 2, 3, 4, 5:
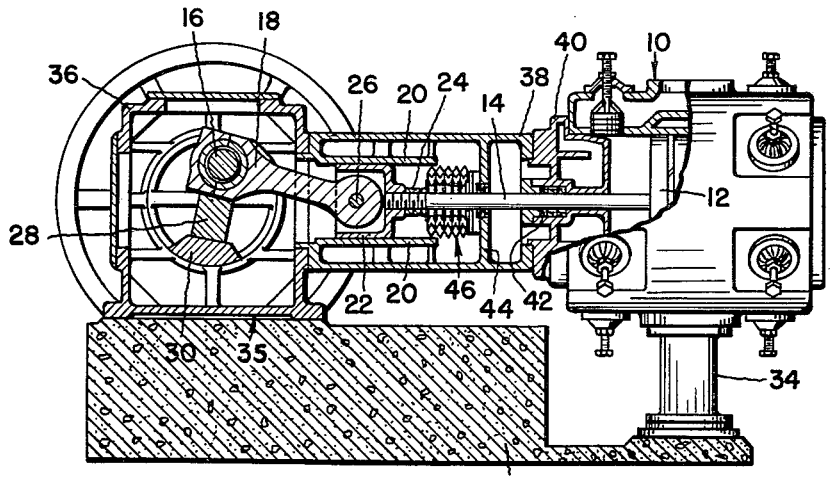

Dec. 18, 1962 W. K. NEWCOMB ET AL 3,068,707
OIL SEALED COMPRESSOR
Filed Nov. 29, 1960

INVENTORS
WALLACE K. NEWCOMB
TROELS WARMING
BY
THEIR ATTORNEY

United States Patent Office 3,068,707
Patented Dec. 18, 1962

3,068,707
OIL SEALED COMPRESSOR
Wallace K. Newcomb, Painted Post, and Troels Warming, Corning, N.Y., assignors to Ingersoll-Rand Company, New York, N.Y., a corporation of New Jersey
Filed Nov. 29, 1960, Ser. No. 72,518
5 Claims. (Cl. 74—18.2)

This invention relates to seals and more particularly to a seal for a wall having an aperture with an axially movable member passing through the aperture.

The novel seal arrangement may be used in many and various devices heretofore having two relatively movable members and a seal rigidly fixed to one of the members so movement causes relative face to face movement between one member and the seal face. With this type of a sealed device, it can readily be seen that through use, there will be a definable amount of wear of the seal thus making total and complete sealing impossible. Therefore, in many instances seal means heretofore utilized became ineffective after limited operation of the device. One device that requires a total seal, and in which the novel seal arrangement of the application will be described, is in a compressor having a piston reciprocatory in a compression chamber or cylinder actuated by a piston rod or drive shaft extending outwardly therefrom to be motivated by a suitable power unit. The connections to the power unit are ordinarily lubricated with suitable oil which is difficult to confine to the crankcase. When the piston of the compressor is of the non-lubricated type it is difficult to prevent lubricating oil from creeping along the piston rod or drive shaft and getting into the cylinder, and thus contaminating the gas being pumped.

An object of this invention is to provide means for sealing wall having an aperture and a rod movable axially in the aperture.

Another object of this invention is to provide a complete seal for two members, one passing through and movable relative to the other, in which the seal means is connected to each of the members.

Another object of this invention is to provide a complete seal for an arrangement having two members, one passing through and movable relative to the other, in which there is no relative face to face movement between the seal and either of the members.

This invention contemplates seal means for a wall having an aperture and an axially movable rod extending through the aperture, the seal means comprising a flexible tubular enclosing member about the rod and having ends sealingly attached to the rod and to the wall around the aperture.

These and other objects and advantages of the invention will be more clearly understood by referring to the following description and the accompanying drawing which is merely illustrative and is not intended to define any limits of the invention.

FIGURE 1 is a side view of such a compressor, portions being broken away to show the internal construction of the seal and related parts, FIG. 2, a cross sectional view of the seal and related parts, FIG. 3, a sectional view along the line 3—3 of FIG. 2, looking in the direction of the arrows, FIG. 4, a cross sectional view of an alternative form of the seal portion of the compressor, and FIG. 5, a section taken at the line 5—5 of FIG. 4, looking in the direction of the arrows.

Referring to the drawing, the compressor includes a cylinder 10 provided with a reciprocatory piston 12 actuated by a drive shaft or piston rod 14 connected to a crank 16 by a connecting rod 18. Since as indicated, compressor 10 is of the double acting type, piston rod 14 reciprocates in a straight line and is guided at its outer end by a crosshead consisting of guides 20 and a slide 22. The rod 14 has a threaded end 24 to engage slide 22. A connecting rod 18 is pivotally mounted on a wrist pin 26 carried by slide 22. Crank pin 16 is part of a crank 28 having counter-weight 30.

The arrangement above described is adapted to be mounted on a suitable foundation 32 supporting cylinder 10 on a pedestal 34 which may be the inlet pipe to cylinder 10. A frame 35 connected to cylinder 10 is independently mounted on foundation 32 and includes a crankcase 36 housing crank 28, and a distance piece 38 connecting the front head 40 of cylinder 10 with crankcase 36. As shown, crosshead guides 20 are formed integrally with distance piece 38.

In the operation of a compressor of the non-lubricated type, oil used to lubricate such parts as crank pin 16 and wrist pin 26 as well as crosshead guides 20 will creep along piston rod 14 unless suitable precautions are used. Packing glands 42 in head 40 are effective to prevent the escape of compressed gas from cylinder 10 but will not stop the introduction of lubricating oil.

To this end suitable sealing elements are provided for piston rod 14 which include an apertured wall 44 interposed between cylinder 10 and crosshead guides 20, and an extensible flexible enclosing member 46 encircling piston rod 14 and sealingly attached thereto at one end and at the other attached to wall 44 around the aperture.

Details of the sealing elements are shown in FIGS. 2 and 3. The tubular enclosing member 46 consists of a plurality of substantially rigid rings 48 encircling shaft 14 and spaced from each other, rings 48 being separated from each other by diaphragms 50 alternately positioned between the rings. The outer end ring 52 is provided with a collar 54 fitting tightly on shaft 14 and held thereon by a suitable set screw or other fastening means. At the opposite end, the ring 48 is attached to a circular plate 56 mounted on flange 58 attached to wall 44 and holding in place packing 60 encircling piston rod 14. Diaphragms 50 are of any suitable design to provide flexibility to enable rings 48 to move with respect to each other. In the construction shown, diaphragms 50 are U-shaped in section.

Piston rod 14 reciprocates and it will be seen that the enclosing member 46 expands and retracts accordingly as the end ring 52 is pushed to and fro. It is desirable that the amount of motion of the intermediate rings 48 should be equalized so as to devide the flexing of diaphragms 50 evenly. It is also desirable to provide means to prevent sagging movement of member 46 radially with respect to rod 14, and for this purpose is provided a plurality of bars 62 in sets pivotally interconnected pantographwise (FIG. 3) and attached to member 46 at spaced intervals lengthwise thereof. The pivotal connection points 64 are attached to rings 48 and the end ring 52 by links 66 attached to rings 48 and 52.

In the construction shown in FIGS. 2 and 3 the pantograph arrangement of bars 62 is rigid to the extent that there can be no sag radially and thus rings 48 are held from such tendency. As indicated in FIG. 2 there may by three sets of such pantograph arrangements of bars 62 arranged equidistantly about the periphery of enclosure 46 which will therefore prevent sagging toward the center of shaft 14 from any angle. Likewise, since the longitudinal motion of the pivotal points 64 are evenly divided these bar arrangements will maintain equal distribution of motion throughout the length of enclosing member 46.

With the pantograph arrangement according to this invention, the movements of the seal components are positively controlled, this being a feature of prime importance. Without such control the combination of forces, tension, shear and compression, upon the components would cause high local stresses, and, as a consequence thereof failure of the device within a short period of time.

Another embodiment of the invention is shown in the arrangement of FIGS. 4 and 5 wherein the pantograph arrangement of bars 63, corresponding to bars 62, lies tangential to the rings 48. In this instance, the central pivotal points 65 are attached directly to rings 48. Since the sets 67 of bars 63 are spaced equi-distantly about rings 48 sagging of the rings is prevented in all radial directions of shaft 14.

Thus, by the above construction are accomplished, among others, the objects hereinbefore referred to.

We claim:

1. Seal means in combination with a wall having an aperture and an axially movable rod extending through the aperture, comprising a flexible tubular member about the rod and including a plurality of substantially rigid spaced rings, said member being sealingly attached to the rod and to the wall around the aperture, and limiting means connected to the rings to support and to evenly distribute axial movement in the member in response to axial movement of the rod.

2. Seal means according to claim 1, in which said limiting means includes a plurality of sets of bars, the bars of each set being pivotally interconnected pantographwise and attached to said rings at pivot connections of the bars.

3. Seal means in combination with a wall having an aperture and an axially movable rod extending through the aperture, comprising a flexible tubular member about the rod, said member being sealingly attached to the rod and to the wall around the aperture, and collapsible limiting means connected to and varying in length with the member to support and to evenly distribute axial movement in the member in response to the axial movement of the rod.

4. Seal means in combination with a wall having an aperture and an axially movable rod extending through the aperture, comprising a flexible tubular member about the rod and including a plurality of substantially rigid spaced rings, said member being sealingly attached to the rod and to the wall around the aperture, and collapsible limiting means connected to the rings to support and to evenly distribute axial movement in the member in response to axial movement of the rod.

5. Seal means in combination with a wall having an aperture and an axially movable rod extending through the aperture, comprising a flexible tubular member about the rod and including a plurality of substantially rigid spaced rings and diaphragms connected between the rings, said member being sealingly attached to the rod and to the wall around the aperture, and collapsible limiting means connected to the rings to support and to evenly distribute axial movement in the member in response to axial movement of the rod.

References Cited in the file of this patent

UNITED STATES PATENTS

| | | |
|---|---|---|
| 367,744 | Davis | Aug. 2, 1887 |
| 679,343 | Singer | July 30, 1901 |
| 679,898 | Josse | Aug. 6, 1901 |
| 1,071,299 | Cooper | Aug. 26, 1913 |
| 1,382,081 | Heiliger | June 21, 1921 |
| 1,430,581 | Parsons | Oct. 3, 1922 |
| 2,228,849 | Sandos et al. | Jan. 14, 1941 |
| 2,725,578 | Keller | Dec. 6, 1955 |